F. W. PIPER.
SAFETY COCK.
APPLICATION FILED JUNE 6, 1914.

1,134,904.

Patented Apr. 6, 1915.

Witnesses
Frederick P. Moran
F. H. Hoster

Inventor
F. W. Piper
By Victor J. Evans
Attorney

UNITED STATES PATENT OFFICE.

FRED WARNER PIPER, OF WATERVILLE, MAINE.

SAFETY-COCK.

1,134,904.  Specification of Letters Patent.  Patented Apr. 6, 1915.

Application filed June 6, 1914. Serial No. 843,474.

*To all whom it may concern:*

Be it known that I, FRED WARNER PIPER, a citizen of the United States, residing at Waterville, in the county of Kennebec and State of Maine, have invented new and useful Improvements in Safety-Cocks, of which the following is a specification.

An object of the invention is to provide a safety cock preferably adapted for use in connection with gas pipes or gas pipe systems and which cannot be accidentally operated to result in an escape of the gas or fluid.

The invention contemplates, among other features, the provision of a safety cock which has the particular member or handle thereof normally loose on the body of the cock whereby the operating member is in an inoperative position and must be first moved to an operative position before the valve of the cock can be turned to an open position.

Still further objects of the invention reside in a pointer or indicator also constituting a stop member and whereby the position of the valve can be readily determined.

Figure 1:
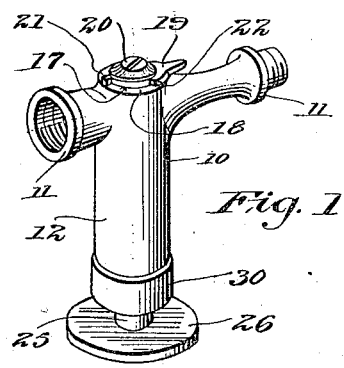
Figure 2:
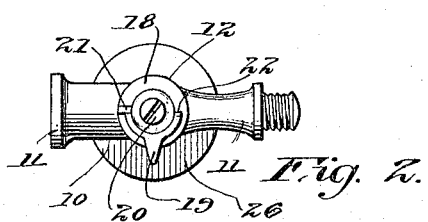
Figure 3:
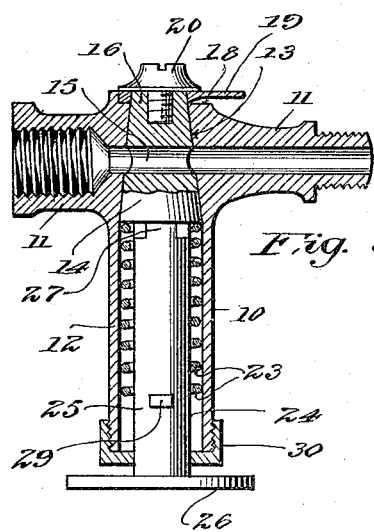
Figure 4:
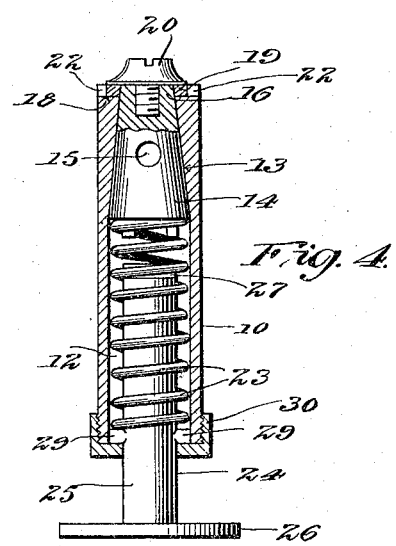
Figure 5:
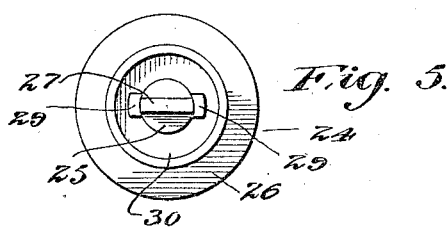
Figure 6:
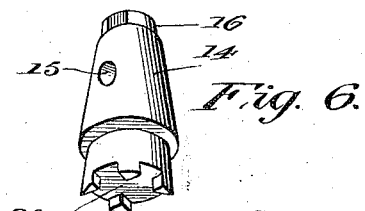

In the further disclosure of the invention reference is to be had to the accompanying drawings, constituting a part of this specification, in which similar characters of reference denote corresponding parts in all the views, and in which:

Figure 1 is a perspective view of the safety cock showing the valve in open position; Fig. 2 is a plan view when the valve is in closed position, the indicator at this time being transverse to the tubular coupling portions of the body of the valve; Fig. 3 is a vertical longitudinal sectional view taken through the valve, showing the operating member in position to turn the valve; Fig. 4 is a vertical transverse sectional view taken through the valve, with the operating member shown in normal position; Fig. 5 is a plan view of the operating member; and Fig. 6 is a perspective view of the valve showing the cruciform groove on its under side.

Referring more particularly to the views, I provide a valve body 10 preferably formed of a single piece of material and providing opposed coupling members 11 connected by a tubular lateral shank 12 formed with a tapered compartment 13 lying between the coupling members 11 and in which is disposed the usual tapered valve 14, said valve being provided with a transverse opening 15 connecting the coupling members for the passage of a gas or fluid when the valve is in open position. The valve has a shank 16 projecting through an opening 17 in the upper portion of the tubular shank or body portion 12 and the said upper part of the body portion is flattened to form a seat 18 for a combined indicator and stop member 19 which is rigidly secured with the shank 16 by a nut 20. The body portion has a projecting lug 21 adapted to be engaged by opposed shoulders 22 on the indicator and stop member 19 and whereby the rotation of the valve will be limited by the shoulders abutting against the lug 21, it being understood that when the indicator or pointer projects longitudinally to the coupling members the valve will be in open position, whereas when the indicator projects transversely with one of its shoulders abutting against the lug the valve will be in closed position.

The valve is engaged on its under side by an expansible helical spring 23 arranged in the body portion or shank 12 of the valve body 10 and an operating member 24 including a stem 25 and knob 26 is adapted to have the stem extend into the body portion or shank of the valve body, said stem on its free end being provided with a diametrical key 27 adapted to be moved into a cruciform groove 28 formed on the under side of the valve 14 when an upward pressure is exerted on the knob 26 to move the operating member against the action of the spring 23 and against which diametrically opposed projections 29 on the stem are adapted to abut, thus normally holding the operating member out of operative engagement with the valve so that the operating member can loosely turn on the valve body and upon which it is held by a cap 30 loosely mounted on the stem and in threaded connection with the body portion of the valve body. By providing the projections 29 it will be seen that the cap 30 when threaded on to the valve body will be engaged by the projections to prevent disengagement of the operating member with the valve body. Now it will be apparent that the operating member is normally in an inoperative position and when pushed upwardly to engage the key with the valve, and rotated, will result in an operation of the valve whereby the same can be moved from an open to a closed position or vice versa, the rotation of the valve being limited by the combined indicator and stop member 19 in the manner mentioned heretofore. Upon releasing the upward pressure on the operating member the same will gravitate into an inoperative position and will be facilitated in gravitating into inoperative position by the action of the spring 23 and which must be compressed in order to move the key into engagement with the valve.

From the foregoing description it will be seen that on account of the fact that the operating member is normally in an inoperative position, it will be almost impossible for a child to properly actuate the device so as to turn the valve and the device also cannot be accidentally operated for the reason that it is first necessary to move the operating member into an operating position and then turn the same to impart the necessary rotation to the valve for the purpose of opening the valve relative to the nipples or coupling members whereby the safety cock is attached to suitable gas piping or gas jets. Furthermore, with a device of the character described a person can readily note the position of the valve by looking at the indicator which is arranged exteriorly of the valve body.

Having thus described my invention, I claim:

In a safety cock, the combination with a valve body having communicating coupling members, of a valve interposed between the coupling members to interrupt communication therebetween, an operating member including a stem, a tubular shank on the valve body and into which the operating member extends, a spring in the shank and encircling the operating member, a key on the stem and adapted to extend into a cruciform groove in the valve to effect an operating connection between the stem and the valve, a pin projecting from the stem and engaged by the spring whereby said spring will normally hold said operating member out of engagement with the valve, said pin being adapted to abut against said tubular shank and limit the pressure of the spring upon the said operating member.

In testimony whereof I affix my signature in presence of two witnesses.

FRED WARNER PIPER.

Witnesses:
A. H. BRIDGES,
F. H. PARKMAN.

Copies of this patent may be obtained for five cents each, by addressing the "Commissioner of Patents, Washington, D. C."